US006824863B1

(12) United States Patent
Kitayama et al.

(10) Patent No.: US 6,824,863 B1
(45) Date of Patent: Nov. 30, 2004

(54) FIBER REINFORCED POLYPROPYLENE-BASED COMPOSITE MATERIAL

(75) Inventors: Takeo Kitayama, Ibaraki (JP); Hiroyuki Hamada, Shiga-gun (JP)

(73) Assignee: Sumitomo Chemical Company, Limited, Osaka (JP)

( * ) Notice: Subject to any disclaimer, the term of this patent is extended or adjusted under 35 U.S.C. 154(b) by 161 days.

(21) Appl. No.: 09/671,301

(22) Filed: Sep. 28, 2000

(30) Foreign Application Priority Data

Sep. 30, 1999 (JP) .......................................... 11-278851

(51) Int. Cl.$^7$ ................................................. B32B 27/12
(52) U.S. Cl. ................................ 428/299.7; 428/292.1; 428/297.4; 428/298.1
(58) Field of Search ................................ 428/299.7, 297.4, 428/298.1, 292.1

(56) References Cited

U.S. PATENT DOCUMENTS

| | | | | |
|---|---|---|---|---|
| 3,207,739 | A | * 9/1965 | Wales et al. | 524/396 |
| 4,403,012 | A | * 9/1983 | Harpell et al. | 442/135 |
| 4,501,856 | A | 2/1985 | Harpell et al. | |
| 4,584,347 | A | * 4/1986 | Harpell et al. | 525/119 |
| 4,894,281 | A | * 1/1990 | Yagi et al. | 428/298.7 |
| 5,039,748 | A | * 8/1991 | Wakatsuki et al. | 525/216 |
| 6,207,600 | B1 | * 3/2001 | Nakajimi et al. | 442/311 |
| 6,388,013 | B1 | * 5/2002 | Saraf et al. | 525/191 |

OTHER PUBLICATIONS

Patent Abstract of Japan of JP–A–H–07–184806.

* cited by examiner

Primary Examiner—Rena Dye
Assistant Examiner—J. Gray
(74) Attorney, Agent, or Firm—Fitch, Even, Tabin & Flannery

(57) ABSTRACT

The present invention provides a fiber reinforced polypropylene-based composite material comprising reinforcing fibers and a matrix resin, wherein the reinforcing fibers and the matrix resin are made of different polypropylene-based resins and wherein a melting point, Tm(F), of the polypropylene-based resin which is the material forming the reinforcing fibers and a melting point, Tm(M), of the polypropylene-based resin which is the matrix resin satisfy Tm(F)–Tm(M)>10° C.

Since the fiber reinforced polypropylene-based composite material of the present invention contains reinforcing fibers and a matrix resin both of which are made of polypropylene-based resins, adhesiveness of the reinforcing fibers and the matrix resin is excellent and therefore the composite material exhibits excellent mechanical strength. Moreover, when the composite material is heated and kneaded with an injection machine, an extruder or the like at a temperature at which both the reinforcing fibers and the matrix resin melt, the polypropylene-based resin which is the material of the reinforcing fibers easily admix with the polypropylene-based resin which is the matrix resin. The resultant can be reused as a uniform polypropylene-based resin.

5 Claims, No Drawings

FIBER REINFORCED POLYPROPYLENE-BASED COMPOSITE MATERIAL

BACKGROUND OF THE INVENTION

1. Field of the Invention

The present invention relates to a fiber reinforced polypropylene-based composite material.

2. Description of the Related Art

It is well known that a fiber reinforced composite material wherein reinforcing fibers are covered with a matrix resin has excellent mechanical properties which can not be exhibited by a single material.

For example, polypropylene-based composite materials reinforced with glass fibers, carbon fibers or the like are known as typical composite materials. In such composite materials, reinforcing fibers provide mechanical strength such as a tensile modulus and a matrix resin adheres to the reinforcing fibers to wrap them. Thus, forms of products are provided.

In the aforementioned composite materials wherein the reinforcing fibers and the matrix resin are formed from different kinds of materials, however, it is difficult to improve adhesiveness between the reinforcing fibers and the matrix resin. For example, in the case of the above-mentioned polypropylene-based composite material reinforced with glass fibers, the surfaces of the glass fibers have been required to be coated with a resin or a finishing agent that adheres to a polypropylene-based resin easily or a maleic acid-modified polypropylene-based resin which has good adhesiveness to glass fibers has been required to be used as the matrix resin.

Moreover, in the case of polypropylene-based composite materials in which glass fibers or carbon fibers are mixed or inserted, it is very difficult for the glass fibers or carbon fibers to be separated from the composite materials. Therefore, when the composite materials are used through recycling, they can be used only as glass fiber reinforced or carbon fiber reinforced polypropylene-based resin. This results in a problem in that products which can be recycled are limited.

SUMMARY OF THE INVENTION

Under these circumstances, the present inventors have studied to develop a fiber reinforced composite material that exhibits a sufficient adhesiveness between reinforcing fibers and a matrix resin and has excellent mechanical properties without being subjected to any special treatment and whose products can be directly recycled and used without the removal of the reinforcing fibers. As a result, they have reached the present invention.

The present invention provides a fiber reinforced polypropylene-based composite material comprising reinforcing fibers and a matrix resin, wherein the reinforcing fibers and the matrix resin are made of different polypropylene-based resins and wherein a melting point, $Tm(F)$, of the polypropylene-based resin which is the material forming the reinforcing fibers and a melting point, $Tm(M)$, of the polypropylene-based resin which is the matrix resin satisfy $Tm(F)-Tm(M)>10°$ C.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step.

DETAILED DESCRIPTION OF THE INVENTION

The following is an explanation on the present invention.

The fiber reinforced polypropylene-based composite material according to the present invention comprises two polypropylene-based resins as basic materials; one of which must be in a fibrous form and another must be a matrix resin. Moreover, both of them must not be the same polypropylene-based resin and must be different kinds of polypropylene-based resins wherein a melting point, $Tm(F)$, of the polypropylene-based resin which is the material forming the reinforcing fibers and a melting point, $Tm(M)$, of the polypropylene-based resin which is the matrix resin have the relationship, $Tm(F)-Tm(M)>10°$ C.

In fiber reinforced polypropylene-based composite materials, to melt a matrix resin and mix or insert reinforcing fibers thereto is most effective. In such a case, if a melting point, $Tm(M)$, of a polypropylene-based resin which is the matrix resin is equal to or greater than a melting point, $Tm(F)$, of a polypropylene-based resin which is the material forming the reinforcing fibers, when the matrix resin is melted and the reinforcing fibers are mixed or inserted thereto the reinforcing fibers also melt; no desired composite materials can be obtained. Furthermore, also from the viewpoint of adhesiveness between the reinforcing fibers and the matrix resin, a relationship between a melting point, $Tm(M)$, of a polypropylene-based resin which is the matrix resin and a melting point, $Tm(F)$, of a polypropylene-based resin which is the material forming the reinforcing fibers is extremely important and the melting temperatures must have the aforementioned relationship, $Tm(F)-Tm(M)>10°$ C.

Typical examples of polypropylene-based resins which become materials of such reinforcing fibers include propylene homopolymers, copolymers of propylene and ethylene and/or α-olefin having 4 or more carbon atoms, and the like.

The polypropylene-based resin forming the reinforcing fibers may comprise either a single kind of polypropylene-based resin or a mixture of two or more kinds of polypropylene-based resins as long as it has the aforementioned melting point relationship between the polypropylene-based resin which is the matrix resin.

Of such polypropylene-based resins as the material forming the reinforcing fibers, polypropylene-based resins having melting points, $Tm(F)$, of not lower than 155° C. are preferable from the viewpoint of the mechanical property improvement of fiber reinforced polypropylene-based composite materials.

To the polypropylene-based resin which is the material forming the reinforcing fibers may be added various additives usually blended to polypropylene-based resins according to their purposes, for example, antioxidants, ultraviolet absorbers, antistatic agents, dispersants, chlorine scavengers, lubricants, splitting agents, metal inactivating agents, flame retardants, pigments, foaming agents and antimicrobial agents.

In order to improve adhesiveness between the reinforcing fibers and the matrix resin, it is preferable to grow crystals of a polypropylene-based resin from the surfaces of the fibers. For this purpose, it is effective to blend a nucleating agent as an additive in the polypropylene-based resin which is the material forming the reinforcing fibers.

As the nucleating agent, those usually used for polypropylene-based resins, which are disclosed, for example, in Japanese Patent No. 2878099, may be applied. Examples of inorganic nucleating agents include talc and mica. Organic nucleating agents may be metal salts of aromatic carboxylic acids such as sodium p-tert-butyl benzoate and aluminum p-tert-butyl benzoate, aromatic carboxylic acids, metal salts of aromatic phosphoric acids and rosin-based nucleating agents.

In addition, examples of high molecular nucleating agents include 3-branched olefins having 5 or more carbon atoms such as 3,3-dimethylbutene-1, 3-methylbutene-1, 3-methylpentene-1, 3-methylhexene-1 and 3,5,5-trimethyhexene-1, polymers of vinylcycloalkanes such as vinylcyclopentane, vinylcyclohexane and vinylnorbornene. Of these nucleating agents, the high molecular nucleating agents are preferable.

The reinforcing fibers applied to the present invention are manufactured by conventional methods using above-mentioned polypropylene-based resins as their materials. The reinforcing fibers are often used after being drawn for the improvement of their mechanical strength in a fibrous direction.

A draw ratio is preferred to be higher, but usually is from 2 to 15 times.

The drawing may be conducted either at low temperatures or at high temperatures. Reinforcing fibers whose diameters range from 6 to 100 $\mu$m after drawing are preferred.

As a form of the reinforcing fibers applied to the present invention, various forms such as a fiber cut in a predetermined length (for example, a long fiber, a short fiber), a fiber oriented in a single direction (for example, a single-directional continuous fiber), a knitted fabric, a woven fabric and a fleece may be selected according to a performance which a fiber reinforced polypropylene-based composite material is required to have. By selecting a form of reinforcing fibers, the performance of a fiber reinforced polypropylene-based composite material can be adjusted.

In the cases where the reinforcing fibers are in the form of the fiber oriented in a single direction, knitted fabric, woven fabric or fleece, those having a certain thickness or fiber density selected may be used according to their purposes or performances. When fibers cut in a predetermined length (for example, long fibers, short fibers) are dispersed in a matrix resin, fibers having lengths ranging approximately from 0.1 to 50 mm are employed.

In general, mechanical strength of reinforcing fibers made of a polypropylene-based resin, for example, a tensile modulus, approximately is proportional to mechanical strength of the fiber reinforced polypropylene-based composite material using the reinforcing fibers. A low tensile modulus of the material forming reinforcing fiber results in a low tensile modulus of the fiber reinforced polypropylene-based composite material to be obtained.

From such a standpoint, reinforcing fibers made of a propylene homopolymer have a high tensile modulus and a fiber reinforced polypropylene-based composite material using the reinforcing fibers as a raw material can exhibit excellent mechanical strength such as a high tensile modulus. The fiber reinforced polypropylene-based composite material, however, is a little poor in spinnability. Therefore, for the improvement of spinnability and drawability after spinning, a butene/propylene copolymer may be mixed, for example, in an amount as much as from 0.1% by weight to 30% by weight of the reinforcing fibers.

However, the reinforcing fibers obtained from the resin composition wherein a butene/propylene copolymer is mixed in a propylene homopolymer has a low tensile modulus and a fiber reinforced polypropylene-based composite material using such reinforcing fibers as a raw material also has a low tensile modulus corresponding to the strength of a raw material, the reinforcing fibers. In such a case, when the nucleating agent described previously is added to the resin composition in which a raw material, the butene/propylene copolymer, has been mixed in an amount as much as from 1 ppm to 500 ppm, a remarkable effect of the use of the nucleating agent, that is, the effect that the reinforcing fibers themselves have a low tensile modulus but the fiber reinforced polypropylene-based composite material obtained by using the reinforcing fibers as a raw material is equivalent to one obtained by using, as a raw material, reinforcing fibers made of a propylene homopolymer.

The polypropylene-based resin to be used as the matrix has no particular limitations as long as its melting point Tm(M) and a melting point Tm(F) of the polypropylene-based resin which is the material forming the reinforcing fibers satisfy the above-described relationship: Tm(F)−Tm(M)>10° C. Examples thereof include propylene homopolymers, copolymers of propylene and ethylene and/or α-olefin having 4 or more carbon atoms, and the like.

The polypropylene-based resin used as the matrix may comprise either a single kind of polypropylene-based resin or a mixture of two or more kinds of polypropylene-based resins as long as it establishes the aforementioned melting point relationship with the polypropylene-based resin which is the material forming the reinforcing fibers.

Of course, to the polypropylene-based resin as the matrix may be added various kinds of additives usually blended to polypropylene-based resins according to their purposes, for example, nucleating agents, antioxidants, ultraviolet absorbers, antistatic agents, dispersants, chlorine scavengers, lubricants, splitting agents, metal inactivating agents, flame retardants, pigments, foaming agents and antimicrobial agents.

The fiber reinforced polypropylene-based composite material of the present invention comprises reinforcing fibers comprising a polypropylene-based resin and a matrix resin comprising a polypropylene-based resin as described previously. A fiber content in the fiber reinforced polypropylene-based resin composite material is not particularly limited and is arbitrary.

However, in order to make the mechanical strength of the fiber reinforced polypropylene-based composite material to be sufficiently high, it is preferable to adjust the fiber content to approximately from 5 vol. % to 75 vol. %. In particular, when fibers in the form of woven fabric, knitted fabric or fleece, the fiber content is preferably adjusted to approximately from 5 vol. % to 50 vol. %.

The fiber reinforced polypropylene-based composite material of the present invention may be produced by arbitrary methods according to known methods.

For example, when producing the fiber reinforced polypropylene-based composite material by film stacking method, a polypropylene-based resin to be a matrix resin is formed into films by an conventional method. Reinforcing fibers produced from a polypropylene-based resin are put between the films and heated by heat pressing, thereby welding the films and the reinforcing fibers. The welded films and reinforcing fibers are then cooled and solidified to produce a sheet-like fiber reinforced polypropylene-based composite material.

The sheet may be shaped into a desired product form at the same time the sheet is produced. The sheet may also be shaped into a desired product form by vacuum molding or the like.

In the case of producing a sheet by this method, the reinforcing fibers are used in the form of fibers oriented in a single direction (for example, single-directional continuous fibers), a woven fabric, a knitted fabric, fleece or fibers cut in a predetermined length (for example, long fibers, short fibers).

In the case of extrusion molding, you may extrude a matrix resin in a molten state into a sheet-like form and then laminate fibers oriented in a single direction, a woven fabric, a knitted fabric, a fleece or the like thereto. In such a case, the matrix resin may be laminated to either one side or both sides of the fiber layer.

Alternatively, a fiber reinforced polypropylene-based composite material having a desired shape may also be produced by previously supplying reinforcing fibers in the form of fibers oriented in a single direction, a woven fabric, a knitted fabric, fleece or the like to between mold members, supplying and packing a molten matrix resin to the mold, and impregnating the reinforcing fibers with the molten matrix resin in the mold and simultaneously shaping them into a predetermined form.

Furthermore, a fiber reinforced polypropylene-based composite material having a desired shape may also be produced by a conventional molding method such as injection molding, injection press molding and blow molding using a molten polypropylene-based resin composition containing reinforcing fibers which has been obtained by melt kneading a matrix resin and reinforcing fibers in the form of a monofilament cut into a length of approximately from 0.5 mm to 50 mm so that the reinforcing fibers do not melt.

In the case of this method, the melt kneading of the reinforcing fibers and the matrix resin may be conducted, for example, by supplying reinforcing fibers in the form of a monofilament and matrix resin pellets through a material-supply port of an injection machine and melt kneading them. The melt kneaded material is supplied from the injection machine to the mold.

Even in any method, it is important to select a combination of a polypropylene-based resin as a material of the reinforcing fibers and that as a matrix so that the matrix resin melts with keeping the fibrous form and to establish a temperature condition where the reinforcing fibers keep their fibrous form without melting completely and the matrix resin melts.

Since the fiber reinforced polypropylene-based composite material of the present invention contains reinforcing fibers and a matrix resin both of which are made of polypropylene-based resins, adhesiveness of the reinforcing fibers and the matrix resin is excellent and therefore the composite material exhibits excellent mechanical strength. Moreover, when the composite material is heated and kneaded with an injection machine, an extruder or the like at a temperature at which both the reinforcing fibers and the matrix resin melt, the polypropylene-based resin which is the material of the reinforcing fibers easily admix with the polypropylene-based resin which is the matrix resin. The resultant can be reused as a uniform polypropylene-based resin.

EXAMPLES

The present invention will be further explained in detail by the following examples, but the invention is not limited thereto. In the examples, the measurement of a melting point and a tensile test were conducted according to the following manners.

(Melting Point Measurement)

Using a differential scanning calorimeter (DSC) manufactured by The Perkin-Elmer Corporation, measurement was conducted from 30° C. to 200° C. at a rate of 10° C./min. A crystal melting peak temperature is considered as a melting point.

(Tensile Test)

Using Autograph DSS2000 manufactured by Shimadzu Corporation, measurement was conducted with a 500 Kgf load cell at a tensile rate of 10 mm/min.

A 250-mm-long, 25-mm-wide, 0.5-mm-thick sample was set between a longitudinal 150 mm zipper.

Example 1

Using a 250-$\mu$m-thick film obtained by the extrusion molding of a propylene/ethylene random copolymer (manufactured by Sumitomo Chemical Co., Ltd., Noblene RS160XGP, melting point 130° C.) and reinforcing fibers produced by the method described below, a 250-mm-long, 25-mm-wide, 0.5-mm-thick fiber reinforced polypropylene-based composite material was produced by a film stacking method.

The film stacking conditions were a heating temperature at 163° C., a forming pressure at 2.3 MPa and a holding time of 1 minute. After the holding, a composite material was cooled slowly with a cooling press at 30° C.

A filling ratio of fibers in the composite material obtained was 6 vol. %.

This fiber reinforced polypropylene-based composite material was subjected to the tensile test. As a result, the composite material had a tensile modulus of 0.71 GPa, which was higher than 0.59 GPa, which was the tensile modulus of the polypropylene/ethylene random copolymer which was the matrix resin.

The tensile modulus of the reinforcing fibers used was 3.7 GPa.

(Production of Reinforcing Fibers)

Basic fibers having a fiber diameter of about 50 $\mu$m were obtained by spinning a propylene homopolymer (manufactured by Sumitomo Chemical Co., Ltd., Noblene HD100G2, melting point 165° C.) with an extruder and drawing it at a drawing ratio of twice. Forty eight basic fibers were bundled to form single-directional fibers, which were used as the reinforcing fibers.

Example 2

A fiber reinforced polypropylene-based composite material was produced in the same manner as Example 1 except doing film stacking so that a filling ratio of the reinforcing fibers was 12 vol %. Its tensile modulus test shown that it has a tensile modulus of 0.87 GPa.

Example 3

A fiber reinforced polypropylene-based composite material was produced in the same manner as Example 1 except using the reinforcing fibers produced in the method described below as reinforcing fibers. Its tensile modulus test shown that it has a tensile modulus of 0.70 GPa.

(Production of Reinforcing Fiber)

Basic fibers having a fiber diameter of about 50 μm were obtained by spinning a polypropylene-based resin composition (melting point 165° C.) obtained by blending 5% by weight of a butene/propylene random copolymer to the same propylene homopolymer as that used in Example 1 and further adding 50 ppm of polyvinylcyclohexane as a nucleating agent with an extruder and drawing the spun composition at a drawing ratio of twice. Forty eight basic fibers were bundled to form single-directional fibers, which were used as the reinforcing fibers.

The tensile modulus of the reinforcing fibers used was 2.8 GPa.

What is claimed is:

1. A fiber reinforced polypropylene-based composite material comprising reinforcing fibers and a matrix resin, wherein the reinforcing fibers and the matrix resin are made of different polypropylene-based resins, wherein a melting point, Tm(F), of the polypropylene-based resin which is the material forming the reinforcing fibers and a melting point, Tm(M), of the polypropylene-based resin which is the matrix resin satisfy Tm(F)−Tm(M)>10° C., wherein a nucleating agent is added to the polypropylene-based resin which is the material forming the reinforcing fibers, and wherein the matrix resin contains crystals growing from the surfaces of the fibers.

2. The fiber reinforced polypropylene-based composite material according to claim 1, wherein the polypropylene-based resin which is a material forming the reinforcing fibers is a propylene homopolymer having a melting point, Tm(F), of not lower than 155° C. or a copolymer of propylene and ethylene and/or α-olefin having 4 or more carbon atoms.

3. The fiber reinforced polypropylene-based composite material according to claim 1, wherein the reinforcing fibers are mixed or inserted to the matrix resin in the form of a knitted fabric, a woven fabric or a fleece.

4. The fiber reinforced polypropylene-based composite material according to claim 1, wherein the reinforcing fibers are mixed or inserted to the matrix resin with being oriented in a single direction.

5. The fiber reinforced polypropylene-based composite material according to claim 1, wherein the reinforcing fibers have an average fiber diameter of from 6 to 100 μm.

* * * * *